US005767766A

United States Patent [19]
Kwun

[11] Patent Number: 5,767,766
[45] Date of Patent: Jun. 16, 1998

[54] APPARATUS AND METHOD FOR MONITORING VEHICULAR IMPACTS USING MAGNETOSTRICTIVE SENSORS

[75] Inventor: Hegeon Kwun, San Antonio, Tex.

[73] Assignee: Southwest Research Institute, San Antonio, Tex.

[21] Appl. No.: 667,442

[22] Filed: Jun. 21, 1996

Related U.S. Application Data

[60] Provisional application No. 60/003,113, Sep. 1, 1995.
[51] Int. Cl.$^6$ ...................................................... B60Q 1/00
[52] U.S. Cl. .......................... 340/436; 180/282; 307/10.1; 280/735; 364/424.055
[58] Field of Search .................................. 340/436, 668, 340/669; 180/282, 274; 307/10.1; 280/735, 734, 730.2; 364/424.055, 424.56

[56] References Cited

U.S. PATENT DOCUMENTS

| | | | |
|---|---|---|---|
| 2,534,276 | 1/1950 | Lancor, Jr. | 73/35 |
| 4,106,447 | 8/1978 | West | 123/117 |
| 4,161,665 | 7/1979 | Buck et al. | 310/26 |
| 4,290,301 | 9/1981 | Yamaguchi et al. | 73/35 |
| 4,366,702 | 1/1983 | Yamaguchi et al. | 73/35 |
| 4,409,816 | 10/1983 | Yamaguchi et al. | 73/35 |
| 4,463,610 | 8/1984 | Anderson, III et al. | 73/654 |
| 4,643,023 | 2/1987 | Capps | 73/117.3 |
| 4,736,620 | 4/1988 | Adolph | 73/35 |
| 5,119,783 | 6/1992 | Komurasaki | 123/425 |
| 5,456,113 | 10/1995 | Kwun et al. | 73/587 |
| 5,457,994 | 10/1995 | Kwun et al. | 73/587 |
| 5,580,084 | 12/1996 | Gioutsos | 280/735 |

*Primary Examiner*—Thomas Mullen
*Assistant Examiner*—Nina Tong
*Attorney, Agent, or Firm*—Gunn, Lee & Miller, P.C.

[57] ABSTRACT

The present invention provides an apparatus and method for monitoring vehicular impacts using magnetostrictive sensors. The apparatus includes at least one and sometimes a plurality of magnetostrictive sensors positioned about a motor vehicle at locations appropriate for detecting and measuring stress waves in the structure of the vehicle caused by a vehicular collision or crash. Signals from the magnetostrictive sensors are collected and analyzed in a signal processing system that identifies a severe crash condition and commands a restraint trigger control system to activate one of a number of vehicle occupant restraint systems. The magnetostrictive sensors are structurally simple and mounted to integral elements of the vehicle by adhesive or mechanical attachment. Use of such magnetostrictive sensors in place of more conventional sensors (e.g. accelerometers) provides the opportunity to recognize and react to impact conditions within a significantly reduced time-frame.

15 Claims, 8 Drawing Sheets

APPARATUS AND METHOD FOR MONITORING VEHICULAR IMPACTS USING MAGNETOSTRICTIVE SENSORS

This application claims the benefit of U.S. Provisional application No. 60/003,113 filing date Sep. 1, 1995.

BACKGROUND OF THE INVENTION

1. Field of the Invention

The present invention relates generally to methods and devices for monitoring, measuring, and evaluation of motor vehicle operation. The present invention relates more specifically to a method and apparatus for sensing, measuring, analyzing, and reacting to vehicle collisions by detecting mechanical stress pulses created by the collision process and the mechanical action and interaction of the vehicle's structure.

2. Background on the Magnetostrictive Effect and Magnetostrictive Sensors

The magnetostrictive effect is a property peculiar to ferromagnetic materials. The magnetostrictive effect refers to the phenomena of physical, dimensional change associated with variations in magnetization. The effect is widely used to make vibrating elements for such things as sonar transducers, hydrophones, and magnetostrictive delay lines for electric signals.

The magnetostrictive effect actually describes physical/magnetic interactions that can occur in two directions. The Villari effect occurs when a time-varying stress or strain within a ferromagnetic material, under an established magnetic field, causes a magnetic flux change detectable by a receiving coil in the vicinity. The Joule effect, being the reverse of the Villari effect, occurs when a changing magnetic flux induces a time-varying mechanical strain or stress in a ferromagnetic material.

As described in U.S. Pat. Nos. 5,456,113 and 5,457,994, mechanical stress waves can be generated in ferromagnetic materials by using a sensor designed to cause the Joule effect. The same sensor can be used to detect mechanical stress waves propagating in the material, or time-varying stresses or strains present in the material, based on the Villari effect. These sensors, called magnetostrictive sensors (MsS), can be used for active inspection of structural components to detect defects such as corrosion pits and cracks as well as for passive monitoring or detection of stress waves produced by cracking, mechanical impacts, or vibrations.

Magnetostrictive sensors have various advantages over other types of sensors such as piezoelectric based sensors (e.g., ultrasonic transducers, acoustic emission sensors, and accelerometers). One of these advantages is that magnetostrictive sensors require no coupling medium such as liquid or adhesive to transmit mechanical waves from the structure to the sensor. Magnetostrictive sensors can thus be operated with a substantial gap between the sensor and the surface of the structural component. Another advantage is the very broad frequency response (a few Hz to several hundred kHz) which allows better information extraction from the signal as well as monitoring and discrimination of widely varying (e.g., from low frequency vibration to high frequency transients) signals using a single sensor. Another advantage to magnetostrictive sensors is their ruggedness and resistance to harsh environments such as high and low temperatures, mechanical shock, dirty and oily surroundings, and humidity. Yet another advantage to such sensors are their simplicity in structure and low cost of fabrication and operation.

3. Vehicle Crash Detection For Operation of Occupant Safety Devices

In addition to seat belts, the majority of automotive vehicles produced currently are equipped with airbags to enhance the safety of the driver and passengers in the event that the car is involved in a severe crash. At present, most of the airbag systems in vehicles are designed for protection from a frontal crash. Applications of airbag systems for non-frontal crashes such as collisions from the side are emerging.

To properly operate the airbag systems, sensors and an associated data processing system are needed to determine whether activation of the airbag systems is necessary. At present, accelerometers are generally used as the primary crash sensing device, replacing or augmenting the use of mechanical switches. Along with such sensors, various custom-designed and proprietary data processing algorithms are used to discriminate sensor crash signals from signals associated with other minor events, such as light collisions, banging car doors, and rough roads. The signal processing algorithm's ability to reliably discriminate a severe crash from other minor events in a timely manner is a critical element for proper operation of airbag systems.

In order to provide protection from a severe crash, the airbag should be deployed quickly—before the occupants hit surrounding objects such as the steering wheel, dash board, and window. From the instant of a frontal impact, for example, the allowable time for activating the airbag systems is generally less than 50 msec. This includes the time for the sensor to detect crash signals and the time for the on-board data processing system to analyze the detected signals, recognize a severe crash condition, and send a signal to a control unit to activate the airbag systems. Deployment of the air bag system is most effective when impacts are detected and processed quickly.

Currently, accelerometers and accompanying data processing systems can operate effectively in the case of frontal crash conditions, but not for side impact applications. In the case of a frontal crash, the time for the mechanical impact force to reach the occupant is reasonably long because of the relatively long distance from the front of the car to the occupants. As a result, the allowable time for activating the airbag system is correspondingly long. For the case of a side crash, the distance between the side of the car and the occupant is short, and the impact reaches the occupant much more quickly. As a result, the allowable time for activating the airbag system is significantly shorter (about 10 msec). Existing sensors (including both accelerometers and mechanical devices) have been found to be too slow for side impact detection applications. A better means of detecting impacts is needed.

Magnetostrictive sensors (MsS) are capable of detecting mechanical impacts as described in U.S. Pat. Nos. 5,456,113 and 5,457,994. Compared with accelerometers, magnetostrictive sensors are advantageous for impact detection in the following areas. First, the broad frequency response characteristics of magnetostrictive sensors, which extends to several hundred kHz (compared with up to about 1 kHz for accelerometers), permits impact signals detected by the magnetostrictive sensors to have a higher temporal resolution, providing faster recognition of a crash condition.

Another advantage is the ability of the magnetostrictive sensors to detect longitudinal wave modes produced by an impact whose displacements are planar, namely, parallel to the structural surface. In comparison, accelerometers generally detect the flexural vibrational motions caused by an impact whose displacements are out of plane, i.e., normal to the structural surface. Since longitudinal waves travel faster (by more than a factor of two) than flexural waves, magnetostrictive sensors can detect impact signals earlier than accelerometers. Additionally, high frequency flexural waves travel faster than their lower frequency components. Because of the high frequency response characteristics of magnetostrictive sensors, flexural wave modes are detected more quickly than with accelerometers. These technical advantages make the magnetostrictive sensors more useful for side impact detection than accelerometers. Magnetostrictive sensors can also provide additional processing time for frontal crash detection so as to improve overall impact detection system reliability.

SUMMARY OF THE INVENTION

The present invention provides an apparatus and method for monitoring vehicular impacts using magnetostrictive sensors. The apparatus includes at least one and sometimes a plurality of magnetostrictive sensors positioned about a motor vehicle at locations appropriate for detecting and measuring stress waves in the structure of the vehicle caused by collision. Signals from the magnetostrictive sensors are processed in a data processor that analyzes the detected signals, recognizes a severe crash event, and signals a control system to activate vehicle occupant restraint system, such as airbags. Various types of existing signal processing techniques used in frontal crash detection, such as pattern recognition, fuzzy logic, time-frequency analysis, and statistics, may be utilized for developing a suitable crash detection algorithm specific to a given automotive model. The present invention does not require use of a specific crash detection algorithm, but may incorporate a variety of approaches, alone or in combination.

The present invention anticipates use in conjunction with either a plurality of magnetostrictive sensors placed appropriately about a vehicle, or a centrally located magnetostrictive sensor with sufficient signal resolution to identify specific impacts even at a distance from the location of the impact.

Magnetostrictive sensors appropriate for use in conjunction with side impact and vehicular collision detection apparatus can be mounted in any of a number of locations in ordinary motor vehicles.

Such sensor structures include permanent magnet enclosures for electromagnetic coils wound about coil cores, with the entire assembly being adhesively fixed or mechanically attached to the vehicle structural framework. In a preferred embodiment, the magnetostrictive sensors would be attached to ferromagnetic structures within the vehicle, although in alternative embodiments, the sensors may be attached to non-ferrous vehicular components (such as aluminum or plastic) when a ferromagnetic wave guide is utilized or a thin ferromagnetic (e.g. nickel) material is plated or bonded to the non-ferrous component in a local area where the magnetostrictive sensor is to be installed.

DESCRIPTION OF THE PREFERRED EMBODIMENTS

Figure 1:
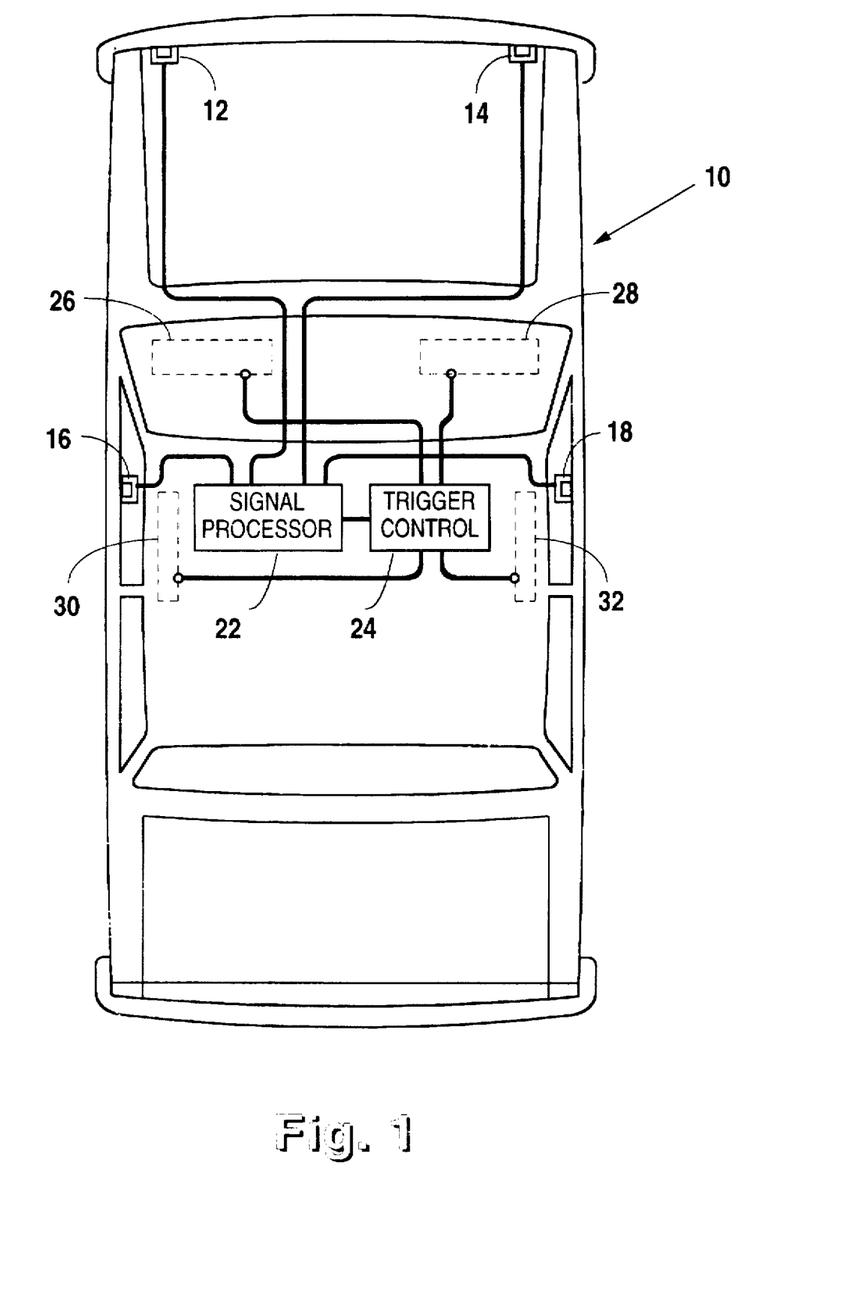
FIG. 1 is a top schematic view of a vehicle showing a general arrangement of the apparatus of the present invention.

FIG. 1 discloses a top view of a typical motor vehicle (10) incorporating, in this case, four magnetostrictive sensors (12, 14, 16, and 18) placed in appropriate locations for sensing vehicle impacts. Specifically, magnetostrictive sensors (12 and 14) are placed at locations near the front of vehicle (10) for sensing front-end collisions as well as on the sides (16 and 18) of the vehicle (10) for detecting and sensing side impacts. As indicated above, the magnetostrictive sensors may be attached to either ferromagnetic structures or non-ferromagnetic structures within the vehicle. When attached to non-ferromagnetic components, a ferromagnetic waveguide is utilized to conduct mechanical stress waves to a point in proximity to the magnetostrictive sensor. It is not necessary that the magnetostrictive sensor be in direct mechanical contact with either the ferrous or non-ferrous structural components of the vehicle. It is well known in the art that magnetostrictive sensors and the like are capable of detecting magnetic field fluctuations brought about by the magnetostrictive effect as long as the sensors are positioned in proximity to the components in question. Appropriate measurements can be made utilizing the magnetostrictive sensor of the present invention when an air gap of approximately 0.00" to 0.25" exists between the sensor and the ferromagnetic structural component or the ferromagnetic waveguide. Each of sensors (12, 14, 16, 18) are electrically connected to signal processor (22) that conditions the signals from the sensors and analyzes the signals to determine whether a severe crash is taking place. Signal processor (22) incorporates an appropriate signal processing algorithm (or group of algorithms) for identifying the detected signals as being characteristic of impact signals.

Once the signal processor (22) identifies the signal as being associated with a significant collision event, it commands trigger control system (24) to activate one or all of a number of passenger restraint systems (26, 28, 30, 32). Such systems (26, 28, 30, 32) typically include air bag units appropriately positioned about the vehicle to restrain the driver and/or passengers. While frontal impact air bags (26 and 28) have now become quite common in the industry, side impact air bags (30 and 32) are just now becoming available on motor vehicles. The requirements for the impact sensing system just described include reliable activation upon an actual impact, and reliable discrimination of non-impact events that might otherwise have many of the characteristics of a collision.

An alternative apparatus (to that shown in FIG. 1) appropriate for use with the present invention could incorporate a single centralized magnetostrictive sensor positioned appropriately to receive stress waves propagating through the vehicular frame from any peripheral location on the vehicle. Because most vehicles incorporate structural frames capable of conducting stress waves from any peripheral point to centralized structural locations, a single magnetostrictive sensor could serve the same function as the plurality of sensors shown in FIG. 1. Appropriate modifications to the signal processing system would be needed to compensate for the location of the centralized sensor and the changes in signal strength, frequency, and timing brought about by the centralized location.

The signal processing algorithm used to identify and discriminate collision event signals need not be universally applicable to all varieties of vehicles. Any particular vehicle for which an installation of the present invention is accomplished could be pre-programmed with a suitable algorithm to identify stress waves associated with collisions for that particular vehicle. The algorithm should be able to identify the appropriate signal characteristics which allow reliable detection of a collision event, and should distinguish non-collision events from collision events so that the system would not be subject to false activation. In order to further increase system reliability and speed, signal conditioning could be applied to the raw, unprocessed magnetostrictive sensor signals provided by sensors (12, 14, 16, 18) to produce conditioned signals (free of extraneous noise or known resonances) for presentation to the algorithm within the signal processor (22). This conditioning could produce a conditioned signal in analog or digital form, and would be applied at some point between sensors (12, 14, 16, 18) and signal processor (22). Such conditioning could also be located within the signal processor (22) itself, as noted hereafter in the description for FIG. 3.

Figure 2A:
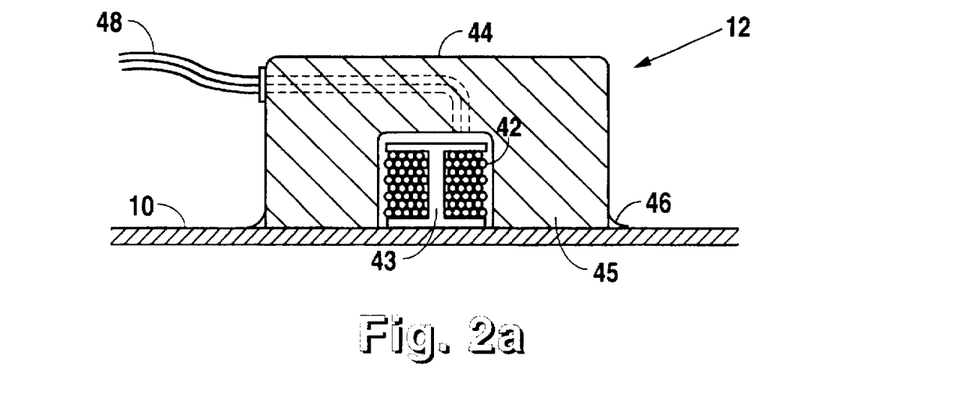
FIG. 2a is a detailed cross-sectional view of a first typical magnetostrictive sensor utilized in conjunction with the apparatus of the present invention.
Figure 2B:
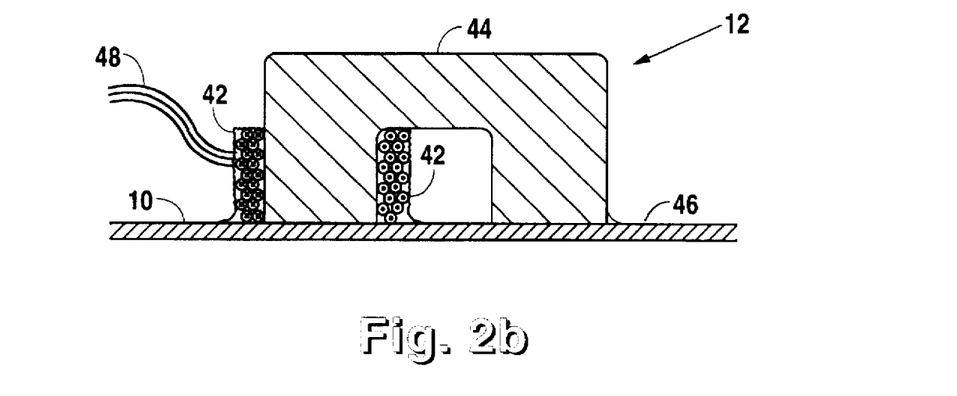
FIG. 2b is a detailed cross-sectional view of a second typical magnetostrictive sensor utilized in conjunction with the apparatus of the present invention.

FIGS. 2a and 2b disclose, in cross-sectional detail, the typical structures of a magnetostrictive sensor (12) utilized in conjunction with the apparatus of the present invention. The structure disclosed in FIG. 2a incorporates permanent magnet (44) surrounding coil (42) and coil core (40), all of which are adhesively (46) or mechanically attached to the vehicle frame in some manner. Surrounding coil (42) responds to fluctuations in the magnetic field brought about by the magnetostrictive effect as described earlier and transmits these variations as voltage signals through signal line (48) to the signal processor (not shown) Permanent magnet (44) provides the bias field appropriate for the magnetostrictive sensor operation.

Figure 2C:
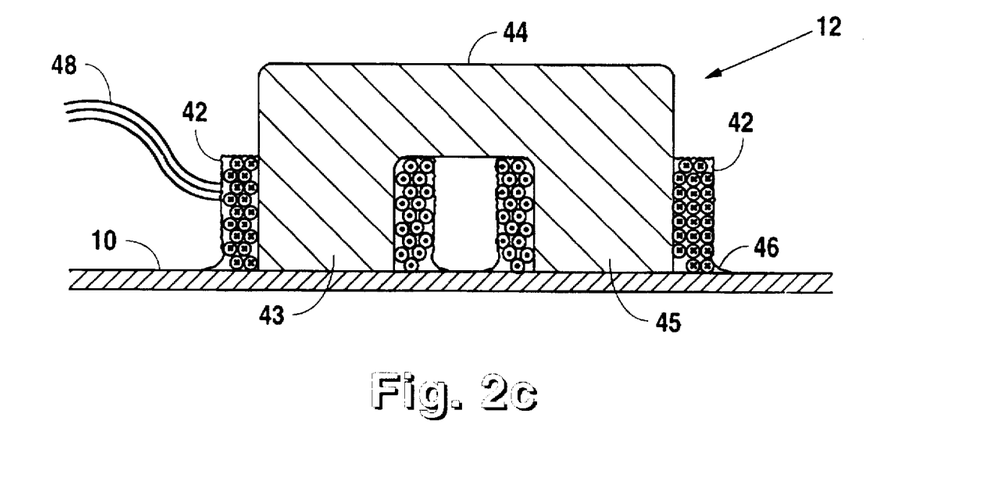
FIG. 2c is a detailed cross-sectional view of a third typical magnetostrictive sensor utilized in conjunction with the apparatus of the present invention.

The structure disclosed in FIG. 2b incorporates permanent magnet (44) with surrounding coil (42) wound directly on a leg of permanent magnet (44). This eliminates the need for a separate core element. Also, as shown in FIG. 2c, the surrounding coil (42) can be wound on both legs of the magnet (44). In this case, the direction of the winding on north pole leg (43) is chosen so that it is in opposite direction to that of the winding on south pole leg (45), and both windings are connected in series. Then, the signals produced by stress waves in these two windings will sum together, whereas signals due to electromagnetic stray fields cancel each other. A sensor with coils wound in this fashion thus has better immunity to electromagnetic interference.

Sensor (12) in FIG. 2b can be attached to the vehicle (10) with adhesive (46) or using mechanical fasteners (e.g. bolts and nuts). Signal line (48) in FIG. 2b carries a voltage signal indicative of fluctuations in the magnetic field brought about by waves travelling in the vehicle structure.

The size of the magnetostrictive sensor (12) disclosed in FIGS. 2a, 2b, and 2c is such that it can easily be placed at any of a number of locations in or on the typical motor vehicle (10).

Figure 3:
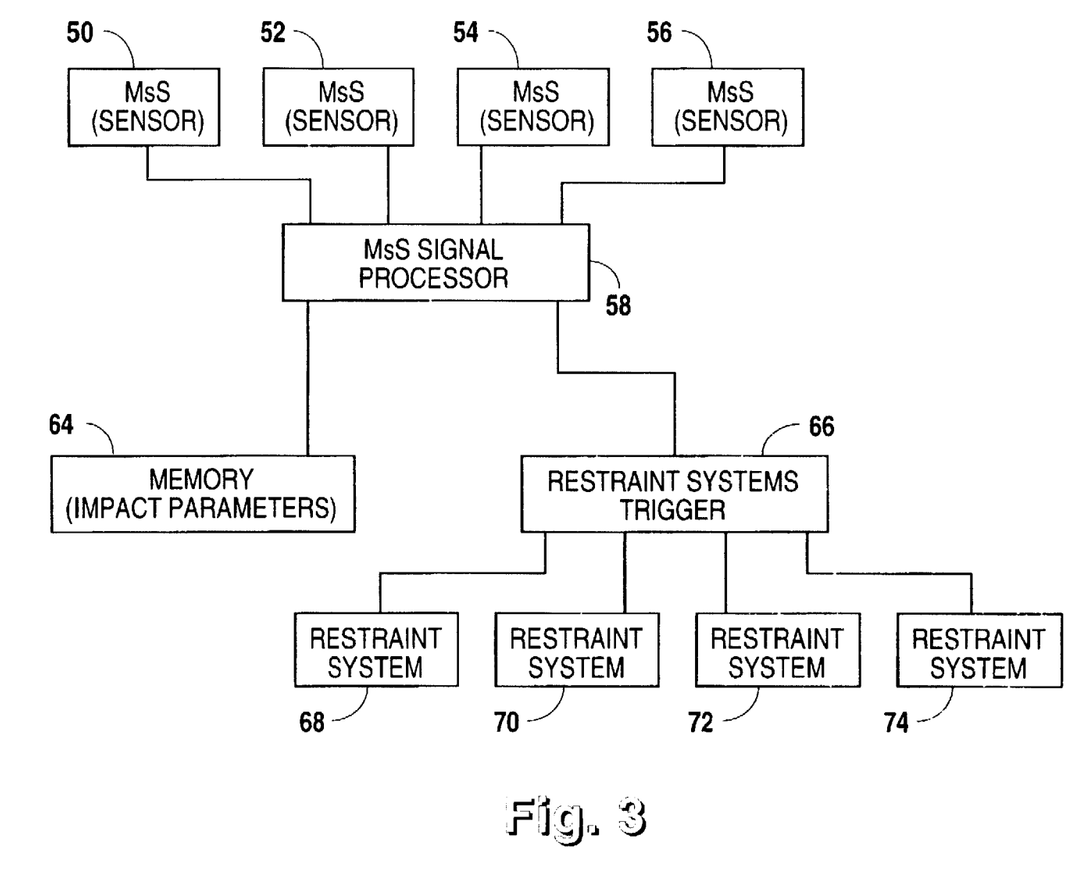
FIG. 3 is a schematic block diagram showing the primary electronic and sensor components of the present invention.

FIG. 3 discloses in schematic block form the primary elements of the system of the present invention. The plurality of magnetostrictive sensors (MsS) (50, 52, 54 and 56) are connected to magnetostrictive sensor signal processor (58). Magnetostrictive sensor signal processor (58) may incorporate amplification circuitry, filter circuitry, multiplexing circuitry and analog to digital conversion circuitry appropriate for processing (conditioning) the signals and presenting them for analysis. It is anticipated that in an active system placed within vehicle (10), magnetostrictive sensor signal processor (58) would continuously monitor the signals received from sensors (50, 52, 54 and 56). Once signals exceeding certain threshold levels were detected, magnetostrictive sensor processor (58) would analyze the signals to determine if signal characteristics associated with collision events were present.

Upon detection of a collision event signal, magnetostrictive signal processor (58) will command restraint system trigger (66) to activate one or all of a variety of restraint systems (68, 70, 72, and 74) within the vehicle. It is anticipated that in some cases, only individual restraint systems might be activated, while in other cases, all of the restraint systems within a vehicle could be activated.

Figure 4:
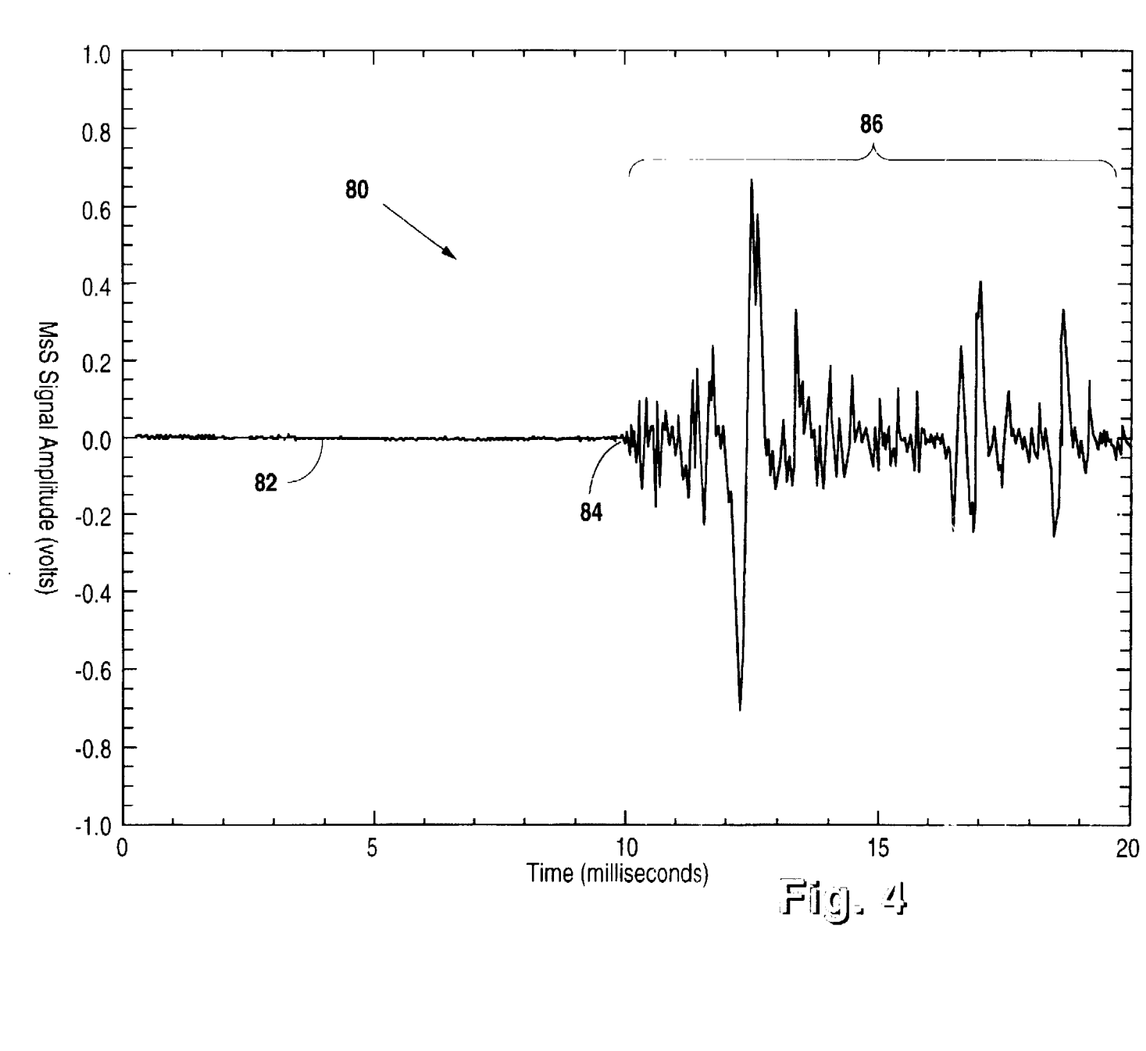
FIG. 4 is a graphic representation of a magnetostrictive sensor signal associated with an impact, displaying signal amplitude on the y-axis and time on the x-axis.

FIG. 4 shows a sample magnetostrictive signal (80) resulting from an impact to a sheet of material such as that used for the outer body of a vehicle. This data was acquired without using a signal amplifier or other conditioning electronics, an omission that contributes to both cost reduction and higher reliability for the system because fewer components are required. The signal amplitude in volts is indicated on the y-axis and the signal timing is indicated on the x-axis, in milliseconds. A relatively neutral signal (82) is displayed by the magnetostrictive sensor with only background noise present up to the time of the impact event (84) at the 10 millisecond point in the graph. From the time of the impact event (84), characteristic stress waves (86) are detected, measured, and translated into an electrical signal. Frequency, amplitude and timing characteristics of this signal may be analyzed by a signal processor to determine the existence of an impact.

Characteristic stress waves (86) show high frequency signals (higher than 10 kHz) at the leading edge, followed by lower frequency signals (down to about 1 kHz). This is an example of higher frequency flexural waves arriving earlier at the sensor location than lower frequency flexural waves. The high frequency signals in the leading edge allow the signal processor to recognize the impact event significantly earlier (by about 2 msec in this example) than would be the case where only lower frequency signals are detected (e.g. with accelerometer sensors whose upper operating frequency is typically limited to about 1 kHz).

Figure 5:
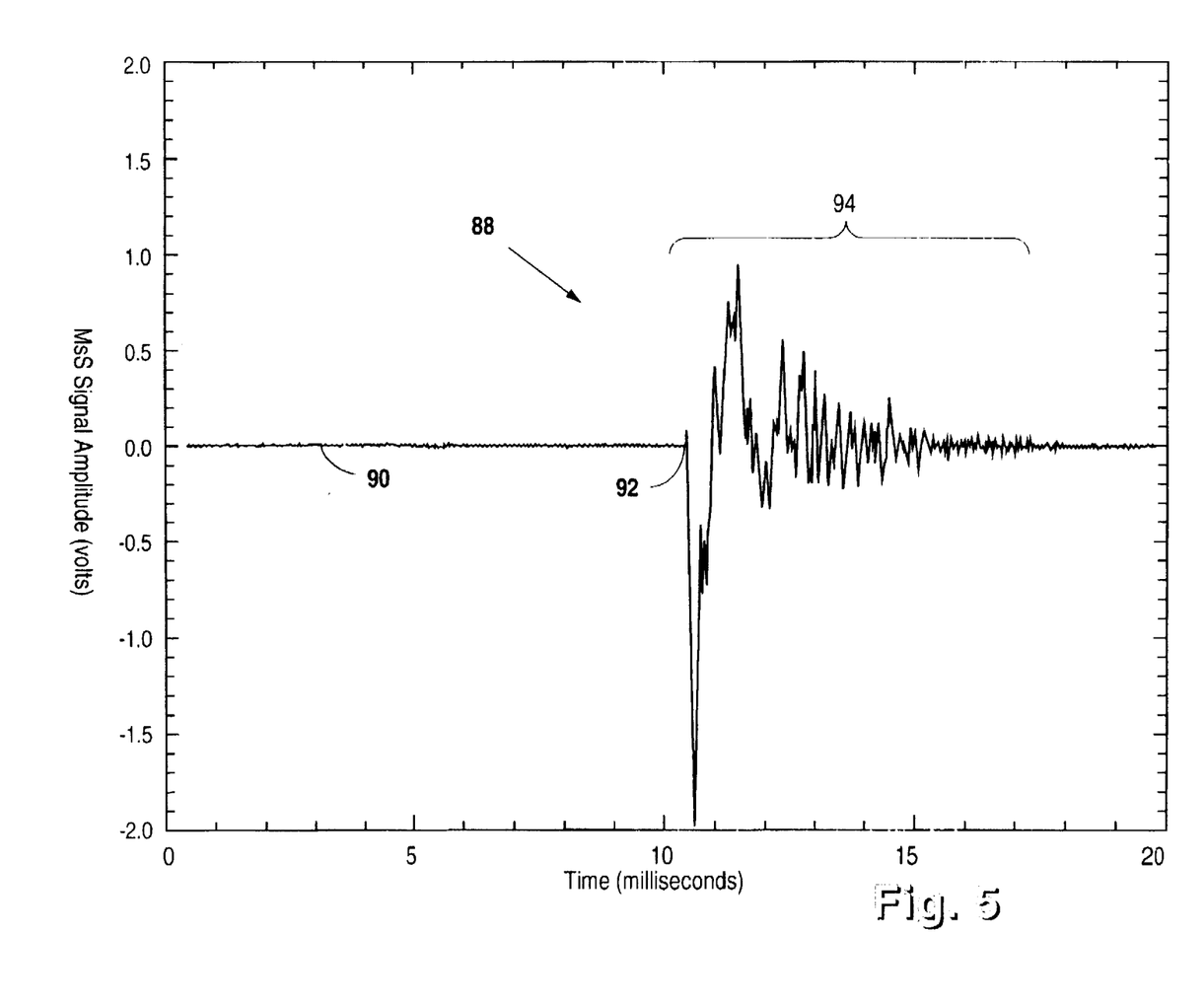
FIG. 5 is a second graphic representation of a magnetostrictive sensor signal associated with an impact event, showing signal amplitude on the y-axis and time on the x-axis.

FIG. 5 is a second example of a magnetostrictive sensor signal (88) resulting from impact (92) to a vehicular frame that was applied proximate to the sensor location. Because of the short travel distance, the high and low frequency wave components arrive at the sensor location almost simultaneously and, thus, the data shows overlapping signals (94) of high and low frequency waves. Even in this case, however, the high frequency components of the signal assist the signal processor in the rapid and reliable identification of an impact (92); a non-magnetostrictive sensor would respond more slowly.

Figure 6A:
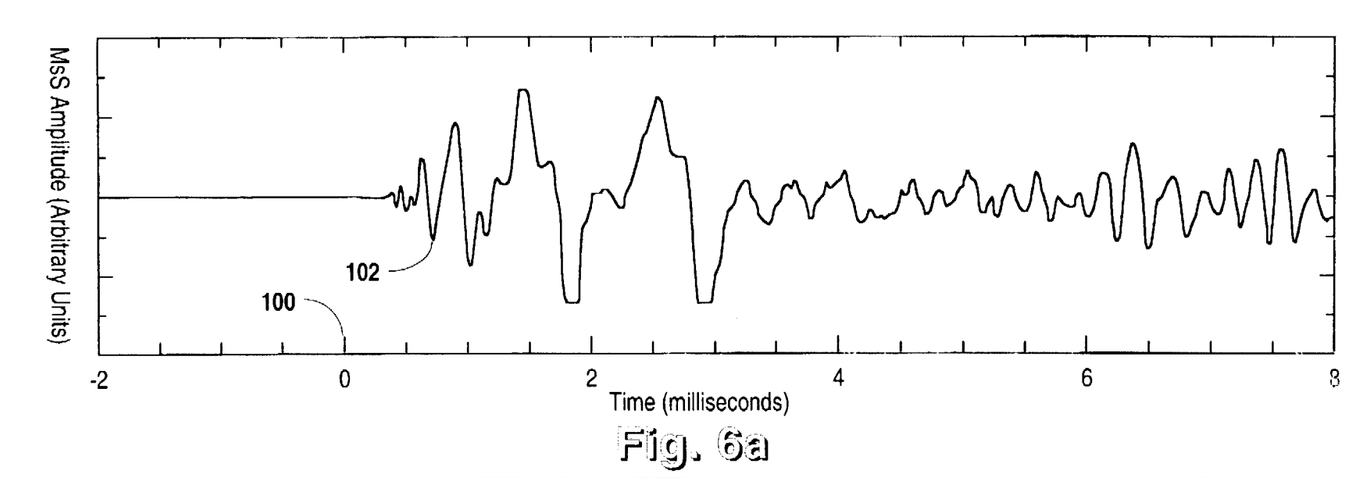
FIG. 6a is a sample magnetostrictive sensor signal resulting from an impact event which occurred one foot from the sensor location.
Figure 6B:
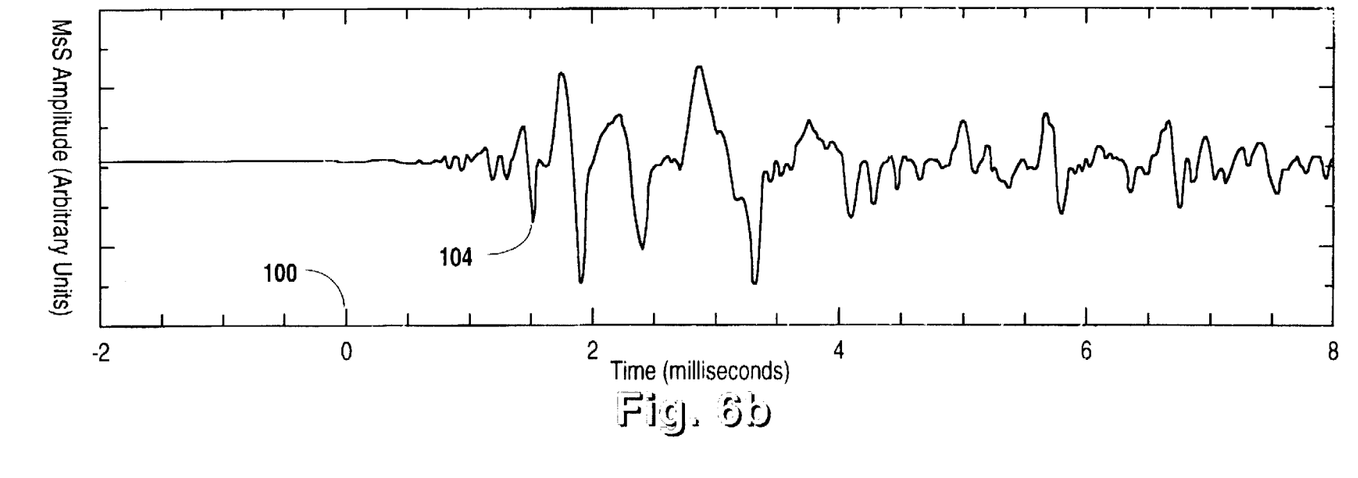
FIG. 6b is a sample magnetostrictive sensor signal resulting from the same impact event originating the signal of FIG. 6a, but with the sensor located two feet away from the impact.
Figure 6C:
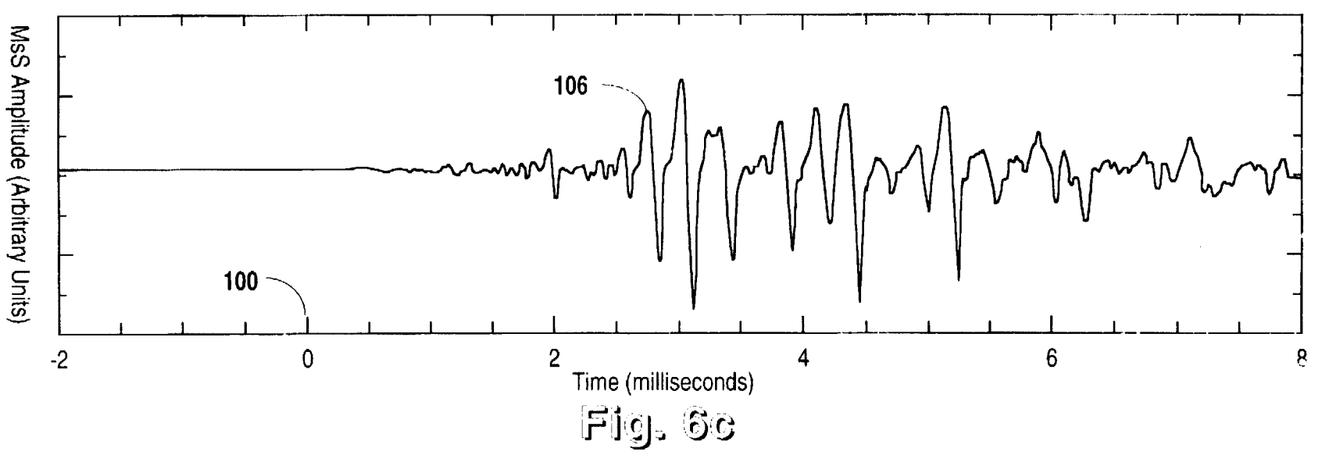
FIG. 6c is a sample magnetostrictive sensor signal resulting from the impact event originating the signal of FIG. 6a, but with the sensor located at a distance of four feet from the impact event.

FIGS. 6a, 6b, and 6c show another example of magnetostrictive sensor signals taken from an impact applied to thin sheet metal. The three sets of data in these figures were acquired simultaneously using three magnetostrictive sensors which were placed approximately 1-ft. (FIG. 6a), 2-ft. (FIG. 6b), and 4-ft. (FIG. 6c) from the impact location, respectively. The zero on the horizontal axis is the instant of the impact in time. The delay in the arrival time of impact-generated-waves at each of these sensor locations with the increasing distance from the impact can be seen. FIG. 6a depicts the impact at time (100) and the first signal excursion above an arbitrary threshold value at (102), which is approximately 0.6 msec later. FIG. 6b depicts the impact at time (100) with the first excursion crossing the same threshold value at time (104), which is about 1.5 msec. later. Finally, FIG. 6c depicts the impact time (100), with the resulting excursion occurring approximately 2.7 msec. later at time (106). As already discussed, the higher frequency flexural waves travel faster than the lower frequency components. This allows quicker detection of impact events and provides a greater time for the signal processor to analyze the data and make a decision to activate or not activate the airbag system.

Figure 7A:
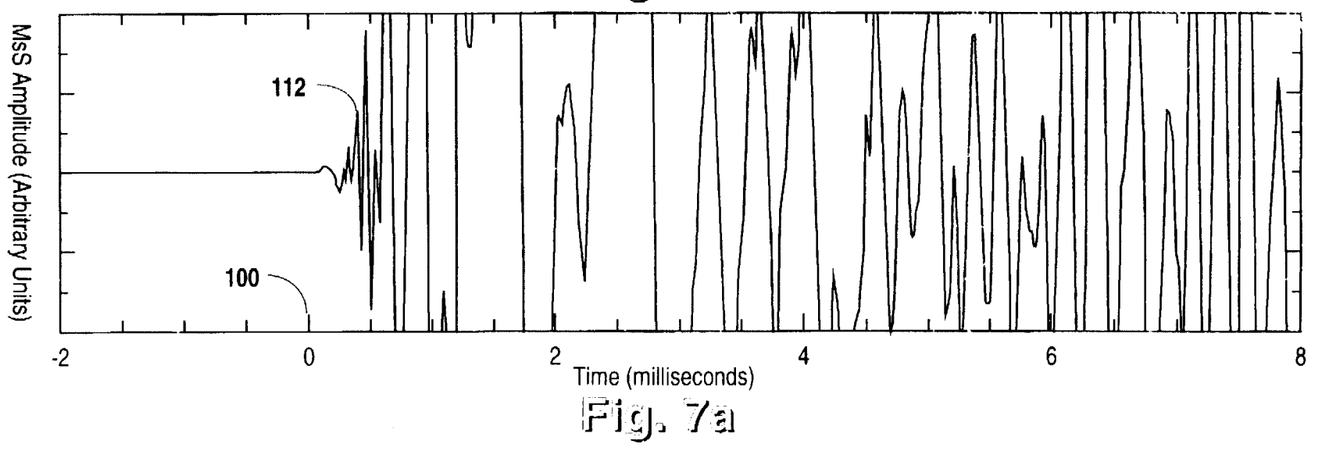
FIG. 7a displays the same signal as is shown in FIG. 6a, but with the vertical axis magnified ten times.
Figure 7B:
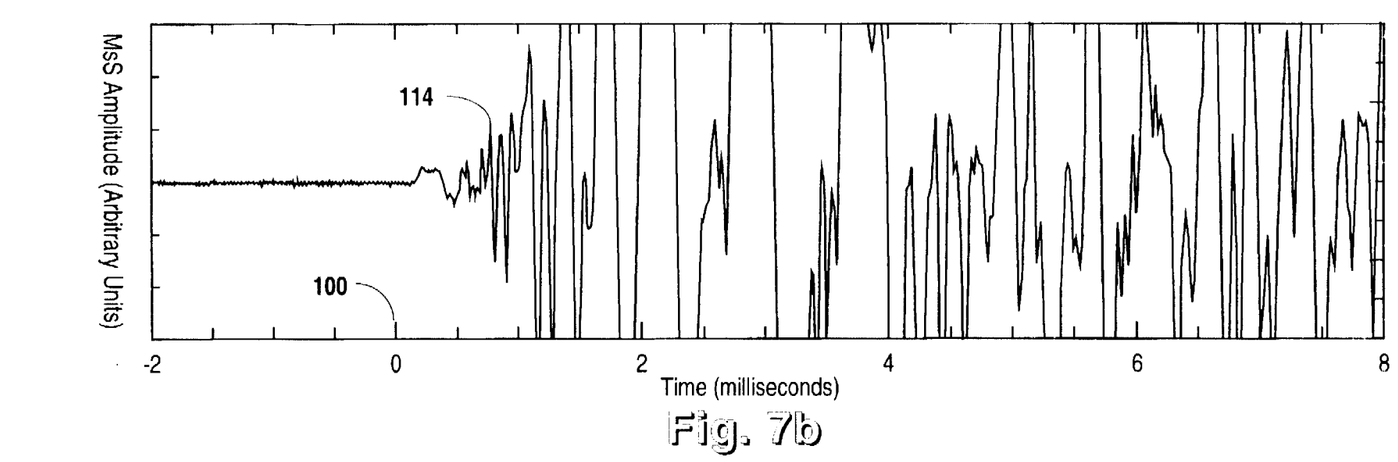
FIG. 7b displays the same signal as is shown in FIG. 6b, but with the vertical axis magnified ten times.
Figure 7C:
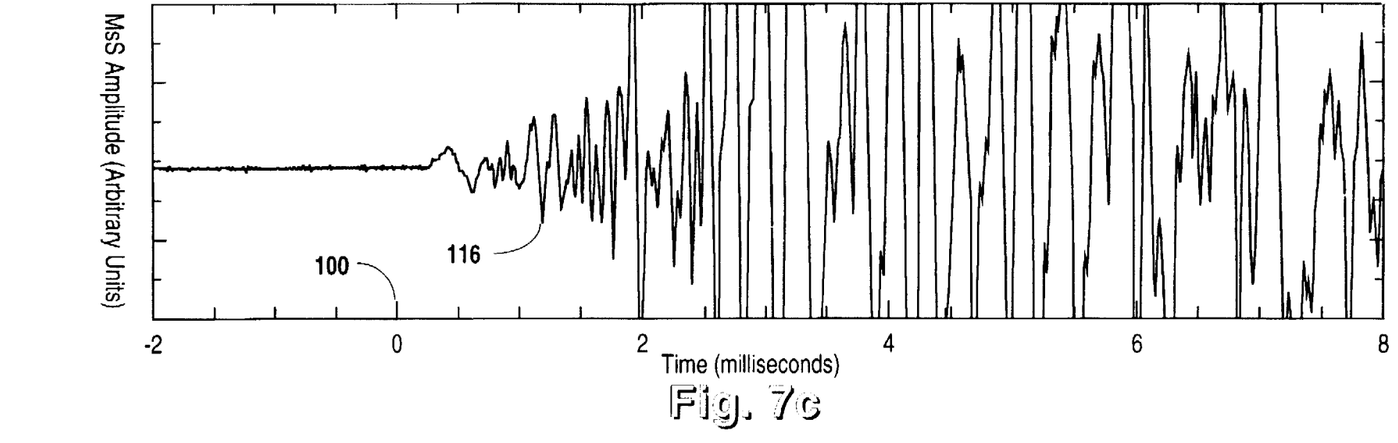
FIG. 7c displays the same signal as is shown in FIG. 6c, but with the vertical axis magnified ten times.

FIGS. 7a, 7b, and 7c are the same plots as shown in FIGS. 6a, 6b, and 6c, except the vertical axis scale is expanded by a factor of 10 to more clearly indicate low amplitude excursions in the leading edge of the impact signal. FIG. 7a shows the impact at time (100) with the first arbitrary excursion over an arbitrary reference threshold at (112), about 0.4 msec. later. FIG. 7b depicts the impact at time (100) with the first excursion occurring at (114), about 0.7 msec. later. FIG. 7c depicts the impact at time (100) with the first excursion occurring at (116), about 1.2 msec. later. In this plot, the difference in arrival time between the leading longitudinal wave signal detected by the sensors at 1-ft. and 4-ft. distances from the impact is only about 0.2 msec, which is almost a factor of 5 faster than the time difference for the high frequency flexural waves. These leading edge signals are longitudinal wave components of the impact-generated-waves detected by the magnetostrictive sensors. As mentioned earlier, longitudinal waves travel (at a speed of about $2 \times 10^5$ inch/sec) much faster than flexural waves and can provide the opportunity for very fast detection of impacts or crash events when magnetostrictive sensors capable of detecting these high speed longitudinal waves are used.

In summary, the present invention provides an apparatus and method for monitoring crash events in a vehicle using magnetostrictive sensors, mounted in a plurality of peripherally located positions on the vehicle, or using a single sensor mounted in a centrally located position, with connections to a signal processing system programmed to recognize impact events. The apparatus and method anticipate connection to a restraint system triggering device appropriate for activation of any one or all of a number of different restraint systems within the vehicle. In addition, the apparatus and method anticipate the possible activation of other systems within the vehicle that constitute an appropriate response to collisions. For example, the apparatus of the present invention could respond to vehicular impacts that might lead to vehicle fires by the activation of fire retardant or fire extinguishing systems positioned within the vehicle. Such systems might be appropriate, for example, in conjunction with rear-end impacts adjacent to or in contact with the vehicle fuel tank. Any number of different responses appropriate to specific vehicular collision conditions could be initiated in this manner.

I claim:

1. An apparatus for monitoring impacts on a vehicle comprising: at least one magnetostrictive sensor positioned in proximity to a ferromagnetic structural component of said vehicle;

a magnetostrictive sensor signal processor, said signal processor comprising:

an input for receiving an unprocessed signal from said magnetostrictive sensor;

a signal analyzer for identifying signal amplitudes, frequencies, and timing characteristics of said unprocessed signal which are indicative of an impact event on said vehicle;

an output for generating an output signal responsive to said impact event identified by said signal analyzer;

a passenger restraint system triggering circuit, said triggering circuit receiving said output signal from said signal processor; and     at least one passenger restraint system, said passenger restraint system activated by said passenger restraint system triggering circuit.

2. The apparatus of claim 1, wherein at least one of the passenger restraint systems includes a side impact air bag system.

3. The apparatus of claim 1, wherein at least one of the passenger restraint systems includes a frontal impact air bag system.

4. The apparatus of claim 1, wherein at least one of the passenger restraint systems includes a passenger safety belt interlock system.

5. The apparatus of claim 1, wherein at least one of the magnetostrictive sensors is mounted on said vehicle in a position structurally connected to a side panel of said vehicle.

6. The apparatus of claim 1, wherein at least one of the magnetostrictive sensors is positioned on said vehicle in a central location, approximately equidistant from all points on the periphery of said vehicle, said at least one of the magnetostrictive sensors mounted to a structural frame member of said vehicle.

7. The apparatus of claim 1, wherein each of the magnetostrictive sensors comprises:

a ferromagnetic core bobbin;

an electromagnetic coil winding about said core bobbin; and     a permanent magnet surrounding said core and said electromagnetic coil.

8. The apparatus of claim 1, wherein each of the magnetostrictive sensors comprises:

a permanent magnet; and an electromagnetic coil winding about one or more poles of said permanent magnet.

9. The apparatus of claim 1, wherein said signal processor includes signal conditioning circuitry for producing a conditioned signal from said unprocessed signal, and wherein said signal analyzer acts to identify signal amplitudes, frequencies, and timing characteristics of said conditioned signal which are indicative of said impact on said vehicle.

10. The apparatus of claim 1, wherein an air gap of approximately 0.00 to 0.25 inches exists between at least one of the magnetostrictive sensors and said ferromagnetic structural component of said vehicle.

11. A method for monitoring impacts on a vehicle using magnetostrictive sensors comprising the steps of:

positioning at least one magnetostrictive sensor in mechanical contact with a ferromagnetic structural component of said vehicle;

sensing mechanical waves generated by said impacts on said vehicle;

generating a sensor signal representative of said mechanical waves from said impacts on said vehicle;

programming an impact event algorithm in a signal analyzer, said algorithm for identifying signal characteristics indicative of an occurrence of said impacts on said vehicle;

analyzing said sensor signal for characteristics indicative of an occurrence of said impacts;

generating an output signal responsive to an identified impact event; and triggering at least one vehicle passenger restraint system in response to said output signal.

12. The method of claim 11, wherein said generating step is followed by a signal conditioning step for producing a conditioned signal from said sensor signal and wherein said analyzing step is applied to said conditioned signal.

13. An apparatus for monitoring impacts on a vehicle comprising:

at least one magnetostrictive sensor positioned in proximity to a non-ferrous structural component of said vehicle;

a ferromagnetic waveguide positioned in mechanical contact with said non-ferrous structural component and in proximity to said at least one of the magnetostrictive sensors;

a magnetostrictive sensor signal processor, said signal processor comprising:

an input for receiving an unprocessed signal from said magnetostrictive sensor;

a signal analyzer for identifying signal amplitudes, frequencies, and timing characteristics of said unprocessed signal which are indicative of an impact event on said vehicle;

an output for generating an output signal responsive to said impact event identified by said signal analyzer;

a passenger restraint system triggering circuit, said triggering circuit receiving said output signal from said signal processor; and at least one passenger restraint system, said passenger restraint system activated by said passenger restraint system triggering circuit.

14. The apparatus of claim 13, wherein said ferromagnetic waveguide is placed in simultaneous physical contact with said at least one of the magnetostrictive sensors and said non-ferrous structural component.

15. The apparatus of claim 13, wherein said ferromagnetic waveguide is placed in simultaneous physical contact between said at least one of the magnetostrictive sensors and said non-ferrous structural component.

* * * * *